3,321,275
PROCESS FOR RECOVERING SULFUR DIOXIDE AND AMMONIA FROM AQUEOUS SCRUBBING SOLUTION OBTAINED FROM AMMONIA SCRUBBING OF GASES CONTAINING SULFUR OXIDES
Herbert Furkert, Junkersdorf, near Cologne, and Hans Mühlenbein, Cologne-Lindenthal, Germany, assignors to Chemiebau Dr. A. Zieren G.m.b.H., Cologne-Braunsfeld, Germany, a corporation of Germany
Filed Dec. 1, 1964, Ser. No. 415,095
Claims priority, application Germany, Dec. 3, 1963, C 31,573
11 Claims. (Cl. 23—178)

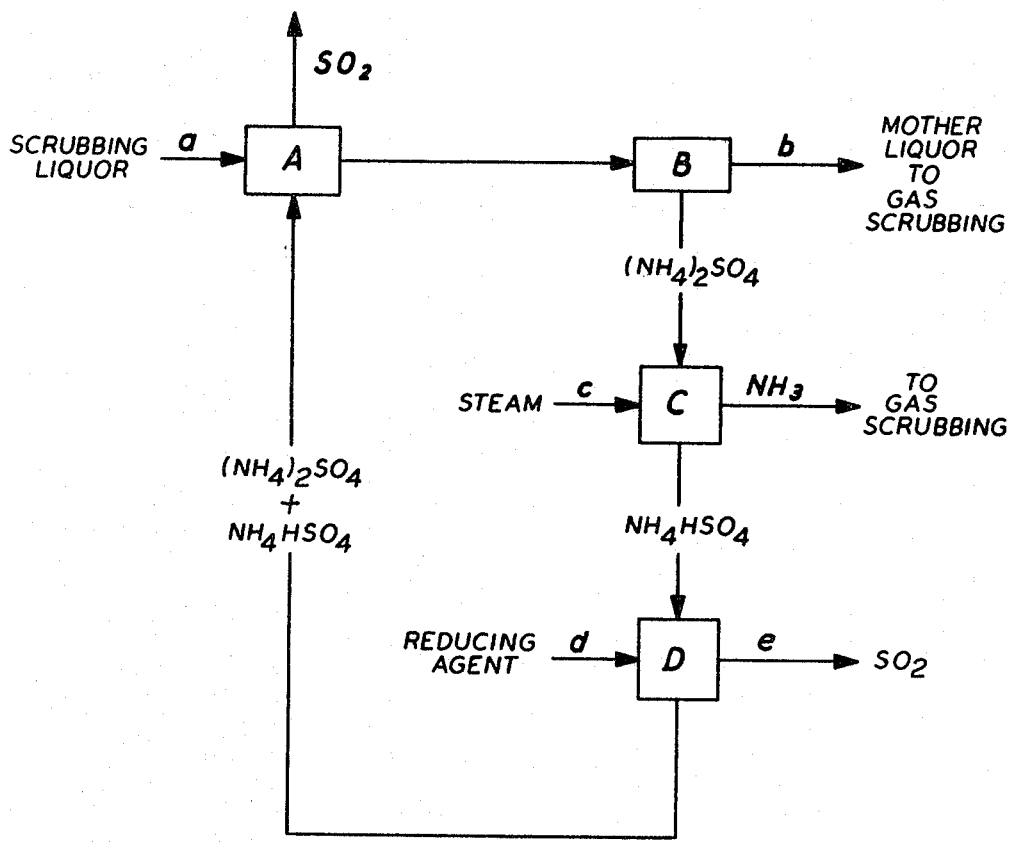

The present invention relates to a process for recovering ammonia and sulfur oxides from liquors containing ammonia and sulfur oxides obtained from scrubbing fluegases or exhaust gases from sulphuric acid manufacture, which contain sulfur oxides, using aqueous ammonia.

Aqueous ammonia solutions used for scrubbing gases from sulfuric acid manufacture produce solutions containing $NH_4HSO_3$, $(NH_4)_2SO_3$ and $(NH_4)_2SO_4$, and also minor quantities of ammonium thiosulfate. Numerous processes have been described for working up such liquors. Ammonium sulfate or ammonium sulfite have been formed by either adding sulfuric acid, or by the so-called sulfammonium process; by disproportionating the ammonium sulfite under pressure at temperatures of about 150–160° C., whereby sulfur is obtained; or by concentrating the solutions and thereby causing the ammonium hydrogen sulfite to expel $SO_2$. The neutral sulfite which is produced after removal of the precipitated ammonium sulfate is recycled in the system. This process suffers the disadvantage that there is little demand for $(NH_4)_2SO_4$, a product of the system. In addition it suffers the disadvantage that the $(NH_4)_2SO_3$ has a substantially lower absorption capacity for sulfur dioxide than does ammonia.

It is one object of the present invention to provide a process whereby substantially all the ammonia used in the scrubbing operation, and whereby substantially all the $SO_2$ and $SO_3$ absorbed during the scrubbing operation, are recovered by a combination of steps.

It is also another object of the present invention to provide a process whereby the reactants used to recover the ammonia and the sulfur oxide are largely recovered and recycled in the process.

In the process of the present invention, aqueous solutions obtained by ammonia scrubbing of gases from sulfuric acid manufacturing processes and containing ammonium sulfates and sulfites are treated to recover first the $SO_2$ and subsequently the ammonia mixture of an alkali metal sulfate and an alkali metal hydrogen sulfate is added to acidify the solution causing $SO_2$ to be given off. The term "alkali metal" as used herein refers to the usual metallic cations, e.g. sodium, potassium, etc. and also refers to the ammonium cation.

Heating is often advantageous in causing the liberation of $SO_2$. The resultant solution is cooled forming a precipitate of alkali metal sulfate, e.g. $(NH_4)_2SO_4$, salt. Concentration of the liquor may be employed to facilitate the obtention of this salt. The mother liquor remaining after the removal of the precipitated salt may be recycled to the gas scrubbing operation. The precipitated salt is preferably ammonium sulfate when the preferred ammonium cation is utilized as the "alkali metal" cation in the defined reactants. When other cations are used, e.g. potassium, the precipitated salt may be a mixture of potassium sulfate, ammonium sulfate, and potassium ammonium sulfate. This of course would result from the use of potassium sulfate and potassium hydrogen sulfate in the previous step, to cause the expulsion of $SO_2$ from the aqueous scrubbing liquors.

The next step of the process involves the liberation of ammonia by decomposition of the solid precipitated salt by heating to a temperature of about 200 to 400° C. and preferably by simultaneously passing stem or an inert gas through the melt. The ammonium sulfate may also be decomposed under vacuum or in a packed column, instead of utilizing the previously described procedure. By the preferred heating procedure, decomposition of ammonium sulfate results in producing the same quantity of ammonia as was originally contained in the scrubbing solution treated. In the procedure utilizing the preferred ammonium hydrogen sulfate and ammonium sulfate reactants for treating the scrubbing solution, the precipitated salt was ammonium sulfate and the decomposition products are ammonia and ammonium hydrogen sulfate as described hereinbefore.

If, however, acidification of the scrubbing liquors was carried out with potassium sulfate and potassium hydrogen sulfate, the decomposition products of the precipitated salt are ammonia and a potassium hydrogen sulfate melt free from ammonia.

The spent scrubbing solution contains beside ammonium sulfite also ammonium sulfate. When heated, the ammonium sulfate delivers at the most half of its ammonia content. Since, however, the entire ammonia which has been withdrawn from the scrubbing in the form of $NH_4$ ions, has to be returned to it, it is provided for by the invention that the sulfate quantity of the sulfate and hydrogen sulfate mixture used during the first step for acidulating, is at least equivalent to the sulfate quantity absorbed or formed in the gas srubbing. By this measure it is possible to expel the necessary ammonia quantity.

The decomposition of the solid sulfate and the consequent expulsion of ammonia is preferably performed by adding the salt which may still be wet, to a molten mass of the sulfate stock at a temperature of about 350–400° C. The molten stock is used as a reservoir from which portions are withdrawn and then treated in a column with superheated steam at a temperature of about 400° C.; the treatment being countercurrent. The alkali metal sulfate is decomposed and ammonia given off which is recycled in the gas scrubbing operation. It is not necessary to decompose all of the alkali metal sulfate into the hydrogen sulfate since the separation of the last percentage of ammonia is uneconomical. This results in building up the amount of processed sulfate above the minimum indicated hereinbefore which is present when acidifying the scrubbing solution.

The last step of the process involves converting the alkali metal hydrogen sulfate (ammonium hydrogen sulfate when utilizing the preferred ammonium cation reactants) as well as any pyrosulfate combined therewith to form a material having a sulfur oxide content equivalent to the sulfate content of the scrubbing liquors originally treated. This conversion may take place by reduction at elevated temperatures. The requisite amount of the alkali metal sulfate needed in the acidifying step of the process is prepared. Reduction may be accomplished by treatment with hydrogen, sulfur, carbon, soot, or reducing sulfur- or carbon-containing compounds.

The ammonia losses normally encountered when reducing ammonium hydrogen sulfate are in this case surprisingly maintained at such low levels that the amount lost is easily replaced without substantially influencing the operating costs. This is attributed to the fact that by the process of the present invention a considerable amount of the alkali metal hydrogen sulfate is still present at the completion of the reduction step. Ammonia losses only become appreciable as an attempt is made to obtain a high percentage conversion during the reduction process. Such a high percentage conversion is not necessary.

By suitable control of the amount of alkali metal hydrogen sulfate reduced in the step of the process, it is possible to control the product to obtain the desired mixture of alkali metal sulfate and alkali metal hydrogen sulfate which is added to the scrubbing solution in the first step of this process to adjust the pH to the desired value and to maintain same. The preferred pH value is between about 5 and 6 with an optimum value of about 5.6. As noted hereinbefore the relative amount of alkali metal hydrogen sulfate and alkali metal sulfate which is the product of the reduction step, is controlled to give the mixture used for acidifying the pregnant scrubbing liquors. The relative amounts of these compounds necessary for proper operation of the acidification step is dependent upon the relative sulfate and sulfite content of the pregnant scrubbing liquor. The alkali metal hydrogen sulfate reacts with the sulfite to form alkali metal sulfate, water, and sulfur dioxide which is liberated. When the process is carried out utilizing all ammonium salts and the reduction step is carried out using sulfur vapors, the amount of ammonium hydrogen sulfate reduced is such that only a portion of the ammonium hydrogen sulfate need be treated in the reducing operation, with the remaining portion of ammonium hydrogen sulfate by-passing the reducing operation and being admixed with the product of the reducing operation.

The reduction, which is the last step of the process, may be performed in a molten phase as well as in a vapor phase. Conversion in the vapor phase is particularly applicable and useful when working with the preferred ammonium salts. The mixture of acid sulfate and neutral salt obtained by this heating or reduction step is returned to the chemical circuit, i.e. is used to acidify the spent scrubbing solution, wherein the sulfur dioxide is given off, as detailed hereinbefore. For better heat utilization, the sulfates are preferably added to the spend scrubbing liquor while still hot, i.e., in molten or in vapor form.

The present invention is further explained by reference to the flow sheet of the figure.

The quantities of material are indicated in kg. moles (kmol), to indicate the relative quantities utilized in the formation and conversion of the various salts. The process is first described in connection with the preferred embodiments, utilizing only the ammonium salts.

Scrubbing liquor arriving via a station A contains, per hour, the following quantities of the noted salts: $(NH_4)_2SO_4$ 50 kmol (48 kmol/hr. having been absorbed or formed during the gas scrubbing opeartion), $NH_4HSO_3$ 60 kmol, and $(NH_4)_2SO_3$ 40 kmol, are mixed with a melt mixture containing $NH_4HSO_4$ 140 kmol and $(NH_4)_2SO_4$ 52 kmol. The result of the mixture at A is the formation of 242 kmol/hr. of $(NH_4)_2SO_4$ and the expulsion of 100 kmol/h. of $SO_2$. The residual mixture after the expulsion of the $SO_2$ is passed to B where the solution is concentrated and cooled, thereby precipitating ammonium sulfate crystals, which are then separated. The residual mother liquor is returned via B to the gas scrubbing operation and carries two kmol/hr. of $(NH_4)_2SO_4$. The precipitated ammonium sulfate salt is passed to C. It is heated to about 400° C. and becomes molten, and is then treated with steam. 236 kmol/hr. of ammonia are expelled and recycled to the gas scrubbing operation. The ammonium sulfate produces 236 kmol/hr. of $NH_4HSO_4$. 4 kmol $(NH_4)_2SO_4$ remain undecomposed. The salt mixture is passed to D, where it is partially reduced by means of a reducing agent introduced via D. The reduction results in the production of 48 kmol/hr. of $SO_2$ and 96 kmol/hr. of ammonium hydrogen sulfate. The $SO_2$ is passed off via E. The resultant mixture remaining contains 48 kmol/hr. of $(NH_4)_2SO_4$ formed from the reduction of the ammonium hydrogen sulfate. The resultant mixture contains 140 kmol/hr. of $NH_4HSO_4$ and 52 kmol/hr. of $(NH_4)_2SO_4$, which is recycled to acidify the scrubbing liquor at the operation A.

An example of the process utilizing the potassium salts as the alkali metal salts follows: 140 kmol/hr. of $KHSO_4$ and 52 kmol/hr. of $K_2SO_4$ were added to scrubbing gas liquors obtained from the gas scrubbing operation and contained 1 kmol/hr. of $K_2SO_4$, 49 kmol/hr. of $(NH_4)_2SO_4$, 60 kmol/hr. of $NH_4HSO_3$, and 40 kmol/hr. of $(NH_4)_2SO_3$ resulting in the formation of 100 kmol/hr. of $SO_2$. Also formed are per hour 119 kmol/hr. of $(NH_4)_2SO_4$ and 123 kmol/hr. of $K_2SO_4$, all in solution. At B the solution is concentrated and cooled, thereby precipitating 118 kmol/hr. of $(NH_4)_2SO_4$ and 122 kmol/hr. of $K_2SO_4$, or the equivalent double salt $KNH_4SO_4$ resulting therefrom. The mother liquor remaining after the precipitation which contains 1 kmol of $K_2SO_4$ and 1 kmol of $(NH_4)_2SO_4$, is returned to the gas scrubbing operation. The precipitated salts are then heated to 400° C. until molten at operation C and also treated with steam thereby forming 236 kmol/hr. of ammonia which are given off and 236 kmol/hr. of $KHSO_4$ together with 4 kmol/hr. of $K_2SO_4$ are produced. The mixture of $KHSO_4$ and $K_2SO_4$ is partly reduced at D, thereby forming 48 kmol/hr. of $SO_2$ and a resultant melt of 140 kmol/hr. of $KHSO_4$ and 52 kmol/hr. of $K_2SO_4$, which is recycled to the acidifying operation at A.

Specific illustrative examples of the process of the present invention follow:

*Example 1*

1300.5 kgs. of a liquor from a sulphuric acid tail gas scrubbing, consisting of 469.5 kgs. $(NH_4)_2SO_4$, 135 kgs. $NH_4HSO_3$, 95 kgs. $(NH_4)_2SO_3$, and water, are, after addition of a mixture of 345 kgs. $NH_4HSO_4$ and 169 kgs. $(NH_4)_2SO_4$ evaporated to such extent, that crystals are obtained which correspond after centrifuging to 734 kgs. dry $(NH_4)_2SO_4$. 139.6 kgs. $SO_2$ are produced during conversion. The mother liquor containing residual $$(NH_4)_2SO_4$$

is returned after addition of the required quantity of water to the scrubbing circuit.

The $(NH_4)_2SO_4$ obtained is melted by heating for 15 minutes to 390° C. by passing superheated steam to form $NH_4HSO_4$. About 94.4 kgs. $NH_3$ are given off and returned to gas scrubbing.

The $NH_4HSO_4$ is now evaporated within a time of 15 minutes in a weak $N_2$ flow, and contacted at 440–450° with 20.9 kgs. sulphur vapor. Thereby, 295 kgs. of the 640 kgs. of evaporated $NH_4HSO_4$ are converted into $(NH_4)_2SO_4$ and $SO_2$.

The sulfate and hydrogen sulfate mixture obtained is recycled to expel $SO_2$ from the scrubbing liquor. When reducing with sulfur, about 3% of the $NH_3$ bound in the $NH_4HSO_4$ are destroyed, which need to be replaced continuously.

*Example 2*

Treated pregnant liquor from a sulfuric acid gas scrubbing operation containing 16.9% $(NH_4)_2SO_4$, 13.5% $NH_4HSO_3$, 9.5% $(NH_4)_2SO_3$ and the remainder $H_2O$, was prepared by the addition to the pregnant scrubbing liquor, $NH_4HSO_3$ and $NH_4HSO_4$ in amounts specified hereinafter, in a continuous process, to produce 5.17 kg. of $(NH_4)_2SO_4$ per minute. This salt was heated to 390° C. and added to a melt which already contained about 20% $(NH_4)_2SO_4$. Water and ammonia are given off. A portion of this product melt is passed into a packed tower countercurrent to about 0.7 kg. per minute of superheated steam to substantially transfer the remaining $(NH_4)_2SO_4$ into $NH_3$ and $NH_4HSO_4$. In summary, about 665 g. of ammonia per minute are given off. Additional heat during this operation is not necessary since the transformation of ammonia pyrosulfate to the hydrogen sulfate by reaction with steam is exothermic. The salt flow through the tower corresponds to 4.4 kg. per minute. From this, 1.04 kg. per minute are contacted with 350 g. per minute of liquid sulfur in an oven in the presence of sufficient air so that reaction temperature of about 450° C. is maintained resulting in the forming of 202 g. of the feed sulfur to $SO_2$. A total of 1265 g. per minute of $SO_2$ are produced which is mixed while still hot with the pregnant scrubbing liquor, to which also is added $NH_3$, $H_2O$ and $N_2$ resulting in the formation of a quantity of $NH_4HSO_3$ equivalent to the ammonia added to the solution. Thereafter the remaining 3.36 kg. per minute of $NH_4HSO_4$ are added to the solution to expel sulfur $SO_2$ from the sulfites resulting in the formation of 5.17 kg. of $(NH_4)_2SO_4$. The $SO_2$ is recycled to the sulfuric acid unit. The process is continued with the $(NH_4)_2SO_4$ treated to liberate $NH_3$. The $NH_3$ loss in the cyclic process is about 5% per cycle.

As many embodiments of this invention may be made without departing from the spirit and scope thereof, it is to be understood that the invention includes all such modifications and variations as come within the scope of the appended claims.

What is claimed is:

1. A process for recovering sulfur dioxide and ammonia from aqueous scrubbing solution obtained from ammonia scrubbing of gases containing sulfur oxides, comprising
    (i) acidifying said scrubbing solution by adding a mixture of compounds having the formula $M_2SO_4$ and $MHSO_4$ wherein M is at least one cation selected from the group consisting of the alkali metals and ammonium cations, whereby sulfur dioxide is formed and removed,
    (ii) (a) precipitating a solid salt containing ammonium cations from the solution remaining after the formation of sulfur dioxide, (b) separating said solid salt,
    (iii) decomposing said salt by heating to between 200° C. and 400° C. to form ammonia and a salt having the formula $MHSO_4$,
    (iv) reducing a part of said $MHSO_4$ to form a mixture of compounds having the formulae $MHSO_4$ and $M_2SO_4$ which is useful as the mixture of compounds in step (i) of this process and which is recycled to step (i).

2. The process of claim 1 wherein in said step (iv), said compound $MHSO_4$ is reduced with an agent selected from the group consisting of hydrogen, sulfur, carbon, and sulfur and carbon-containing reducing compounds.

3. A process for recovering sulfur dioxide and ammonia from aqueous scrubbing solution obtained from ammonia scrubbing of gases containing sulfur oxides, comprising
    (i) heating and acidifying said scrubbing solution by adding a mixture of compounds having the formula $M_2SO_4$ and $MHSO_4$ wherein M is at least one cation selected from the group consisting of the alkali metals and ammonium cations, whereby sulfur dioxide is formed and removed,
    (ii) (a) cooling the solution remaining after the formation of sulfur dioxide to precipitate a solid salt containing ammonium cations, (b) separating said solid salt,
    (iii) decomposing said salt by heating to between about 350° C. and 400° C. and by contacting said salt with steam, to form ammonia and a salt having the formula $MHSO_4$,
    (iv) reducing a part of said $MHSO_4$ by contact with sulfur vapors at elevated temperature to form a mixture of compounds having the formulae $MHSO_4$ and $M_2SO_4$ which is useful as the mixture of compounds in step (i) of this process and which is recycled to step (i).

4. The process of claim 3 wherein the mixture of compounds added to acidify the scrubbing solution is $$(NH_4)_2SO_4$$

and $NH_4HSO_4$.

5. The process of claim 3 wherein the mixture of compounds added to acidify the scrubbing solution is $K_2SO_4$ and $KHSO_4$.

6. A process for working up aqueous scrubbing solution obtained from ammonia scrubbing of gases and containing $(NH_4)_2SO_4$, $NH_4HSO_3$ and $(NH_4)_2SO_3$, comprising
    (i) heating and acidifying said scrubbing solution by adding a mixture of $NH_4HSO_4$ and $(NH_4)_2SO_4$, whereby sulfur dioxide is formed and removed,
    (ii) (a) concentrating and cooling the solution remaining after the formation of sulfur dioxide to precipitate $(NH_4)_2SO_4$, (b) separating said salt,
    (iii) decomposing said $(NH_4)_2SO_4$ by heating to between 350° C. and 400° C. and by contacting said salt with steam to form ammonia and $NH_4HSO_4$,
    (iv) reducing a part of said $NH_4HSO_4$ by heating in contact with sulfur at about 440–450° C., to form a mixture of $NH_4HSO_4$ and $(NH_4)_2SO_4$ which is useful as the mixture of compounds in step (i) of this process and which is recycled to step (i).

7. The process of claim 6 wherein the liquid remaining after precipitation of $(NH_4)_2SO_4$ in step (ii) of said process, is cycled to a gas scrubbing process.

8. The process of claim 6, wherein the $(NH_4)_2SO_4$ and $NH_4HSO_4$ used for acidifying the scrubbing solution contains at least as much sulfate as was built up in the scrubbing solution during the scrubbing process.

9. The process of claim 1, wherein the mixture of $M_2SO_4$ and $MHSO_4$ used for acidifying the scrubbing solution contains at least as much sulfate as was built up in the scrubbing solution during the scrubbing process.

10. The process of claim 1, wherein the amount of hydrogen sulfate converted into sulfur oxides and neutral sulfate, is the amount required to acidify the treated scrubbing solution to a pH between 5 and 6.

11. A process for working up aqueous scrubbing solution obtained from ammonia scrubbing of gases and containing $(NH_4)_2SO_4$, $NH_4HSO_3$, $(NH_4)_2SO_3$ and $K_2SO_4$, comprising
    (i) heating and acidifying said scrubbing solution by adding a mixture of $K_2SO_4$ and $KHSO_4$ whereby sulfur dioxide is formed and removed,
    (ii) (a) concentrating and cooling the solution remaining after the formation of sulfur dioxide to precipitate solid $(NH_4)_2SO_4$ and $K_2SO_4$, (b) separating said solid salt,
    (iii) heating said solid salt and contacting said salt with steam at between 350° C. and 400° C. to produce ammonia and a mixture being largely $KHSO_4$ with a small amount of $K_2SO_4$,
    (iv) heating said mixture of $KHSO_4$ and $K_2SO_4$ in contact with sulfur to reduce a portion of said $KHSO_4$ and to form a mixture of $K_2SO_4$ and $KHSO_4$ which is useful as the mixture of compounds in step (i) of this process and which is recycled to step (i).

References Cited by the Examiner

UNITED STATES PATENTS 2,405,747  8/1946  Hixson _____ 23—178
2,899,277  8/1959  Holowaty _____ 23—119
3,275,407  9/1966  Furkert et al. _____ 23—178

OTHER REFERENCES

Mellor, Comprehensive Treatise on Inorganic and Theoretical Chemistry, vol. 2, pp. 684, 705 (1922).

OSCAR R. VERTIZ, *Primary Examiner.*

BENJAMIN HENKIN, *Examiner.*

R. M. DAVIDSON, A. GREIF, *Assistant Examiners.*